United States Patent [19]

Conway-Jones et al.

[11] Patent Number: 5,379,399
[45] Date of Patent: Jan. 3, 1995

[54] FIFO MEMORY CONTROLLER FOR A DIGITAL VIDEO COMMUNICATIONS CHANNEL HAVING A DETECTOR, COMPARATOR, AND THRESHOLD SELECT LOGIC CIRCUIT

[75] Inventors: David C. Conway-Jones; Peter M. Smith, both of Winchester, England

[73] Assignee: International Business Machines Corporation, Armonk, N.Y.

[21] Appl. No.: 880,440

[22] Filed: May 8, 1992

[30] Foreign Application Priority Data

Oct. 17, 1991 [EP] European Pat. Off. ........ 91309621.0

[51] Int. Cl.⁶ ............................................. G06F 13/00
[52] U.S. Cl. ..................................... 395/425; 377/41;
364/DIG. 1; 364/244.3; 364/244.7; 364/933.6;
364/942.7; 326/35; 326/105
[58] Field of Search ................................. 395/425;
364/200 MS File, 900 MS File; 345/197, 204;
377/41; 307/464; 365/221, 189.07

[56] References Cited

U.S. PATENT DOCUMENTS

| | | | |
|---|---|---|---|
| 4,507,760 | 3/1985 | Fraser | 365/221 |
| 4,694,426 | 9/1987 | Mason | 365/78 |
| 4,833,651 | 5/1989 | Seltzer et al. | 365/189.07 |
| 4,862,419 | 8/1989 | Hoberman | 365/221 |
| 4,864,543 | 9/1989 | Ward et al. | 365/221 |
| 4,888,739 | 12/1989 | Frederick et al. | 365/221 |
| 4,888,741 | 12/1989 | Malinowski | 365/230.05 |
| 4,891,788 | 1/1990 | Kreifels | 365/49 |
| 4,942,553 | 7/1990 | Dalrymple et al. | 364/900 |
| 4,969,164 | 11/1990 | Mehta et al. | 377/41 |
| 5,121,480 | 6/1992 | Bonke et al. | 395/250 |

FOREIGN PATENT DOCUMENTS 0247317 12/1987 European Pat. Off. .
0395210 10/1990 European Pat. Off. .

OTHER PUBLICATIONS

Barbour et a., "A Parallel, High Speed Circular Queue Structure", Proceedings of 32nd Midwest Symposium on Circuits and Systems, vol. 21, Aug. 1989, pp. 1089–1092.

Primary Examiner—Joseph L. Dixon
Assistant Examiner—Frank J. Asta
Attorney, Agent, or Firm—Diana L. Roberts; Mark S. Walker

[57] ABSTRACT

A controller for a first in first out (FIFO) memory comprises detector logic for detecting any difference between the number of addresses in the memory into which data is written and the number of addresses in the memory from which data is read. Comparator logic connected to the detector logic generates a request data transfer signal in response to said difference becoming greater than or equal to a threshold. Threshold select logic connected to the comparator logic is responsive to data having first and second portions being written to the memory. The threshold select logic sets the threshold to a first value when the first portion is being written and sets the threshold to a second value, greater than the first value, when the second portion is being written. Because different thresholds are assoicated with the portions, data, such as a digitized video signal having active line portions separated by control portions for example, can be transferred via the FIFO from one system to another more efficiently in terms of communication bandwidth usage.

6 Claims, 5 Drawing Sheets

FIFO MEMORY CONTROLLER FOR A DIGITAL VIDEO COMMUNICATIONS CHANNEL HAVING A DETECTOR, COMPARATOR, AND THRESHOLD SELECT LOGIC CIRCUIT

BACKGROUND OF THE INVENTION

1. Field of the Invention

The present invention generally relates to first in first out memories (FIFOs) and particularly relates to an adaptive FIFO memory controller for a digital video communications channel.

2. Description of the Related Art

A FIFO typically comprises a memory array in the form of a stack of addressable bytes of data. Data bytes are written into the stack at addresses specified by a write address counter or "pointer" in response to a write enable signal. Similarly, data bytes are read out of the stack from addresses indicated by a read address pointer in response to a read enable signal. The addresses indicated by the read and write address pointers are incremented by read and write clock signals respectively. The read and write addresses are thus respectively indicative of the number of bytes written to and the number of bytes read from the stack.

Because data can be read out of the stack at a different rate to which it was written, FIFOs are useful for providing data communication channels between two data processing systems of different bandwidths. In particular, FIFOs are useful for transferring data to a receiving system that may not be able to accept the data immediately because, for example, it is busy processing data already received. To maximize use of the data channel bandwidth available, data is preferably transferred to the receiving system through the FIFO in blocks or bursts. This usually involves allowing a quantity of data to accumulate in the FIFO before indicating to the receiving system that there is data to be received. The receiving system then reads the burst from the FIFO as a continuous data flow.

The flow of data through the FIFO is usually regulated by a FIFO controller. The FIFO controller generates a data transfer request signal to the receiving system when the difference between the number of data bits written to and the number of data bits read from the stack reaches a predetermined threshold or burst value. The receiving system reads the burst from the FIFO in response to the data transfer request signal.

The FIFO memory apparatus hereinbefore described is useful for transferring bursts of an uninterrupted data flow such as digitized samples of an audio signal for example. However, some data flows, such as digitized samples of video signals for example, can be punctuated by periodic synchronization codes. The synchronization codes associated with a digitized video signal separate the data corresponding to successive video lines of a digitized video image and data corresponding to successive video frames. If the number of samples in each video line is not divisible by the burst value, data representing the end of one video line may be retained in the FIFO as data representing the next video line is written to the FIFO. This may result in the retained data being overwritten. The receiving system may not therefore be able to reproduce the edge of the image. It is therefore desirable to ensure that the FIFO is emptied between successive video line transfers. Conventionally, this has been achieved by requesting data transfer whenever there is at least some data in the stack instead of waiting until enough data for a burst transfer has accumulated. However, this militates against maximizing use of the bandwidth of the data channel.

SUMMARY OF THE INVENTION

In accordance with the present invention, there is now provided a controller for a FIFO memory, the controller comprising: detector logic for detecting any difference between the number of addresses in the memory into which data is written and the number of addresses in the memory from which data is read; comparator logic for generating a request data transfer signal in response to said difference becoming greater than or equal to a threshold; and threshold select logic responsive to data having first and second portions being written to the memory, the threshold select logic setting the threshold to a first value when the first portion is being written and setting the threshold to a second value, greater than the first value, when the second portion is being written.

The present invention is based on the realization that data having first and second portions, such as a digitized video signal having active line portions separated by control portions for example, can be transferred through a FIFO from one system to another more efficiently in terms of communication bandwidth usage if the two portions are transferred as functions of different thresholds. It will be appreciated that the different thresholds facilitate data transfer at correspondingly different rates. The improvement in efficiency provided by the present invention is therefore particularly apparent where the second portion is much longer than the first portion. Thus, the present invention is particularly useful for transferring digitized video signals from one system to another because the active line portions of video signals are generally much longer than the control portions.

Preferably, the threshold select logic comprises: a control signal generator for generating a binary control signal in response to the data being written to the memory, the control signal generator setting the control signal to a first level when the first portion is being written and setting the control signal to a second level when the second portion is being written; and a demultiplexer for connecting a first register storing the first value to the comparator logic when the control signal is set to the first level and connecting a second register storing the second value to the comparator logic when the control signal is set to the second level.

Because the first and second levels are stored in registers, they can be changed simply by loading different values into the registers. This advantageously permits the FIFO controller of the present invention to be reconfigured in accordance with different types of data. The FIFO controller of the present invention is therefore particularly useful for transferring a digitized video signal from a video capture device to a display adapter in a digital video system in which an image can be resolved into any one of a number of pixel-per-line formats.

In a particularly preferred embodiment of the present invention, the control signal generator comprises: a counter having a parallel output for counting addresses in the memory into which data is being written; a first decoder connected to the parallel output for generating a first pulse in response to a first output count; a second decoder connected to the parallel output for generating a second pulse in response to a second output count, the second output count being greater than the first; and a bistable latch connected to the first and second decoders for setting the control signal to the first level in response to the first pulse and setting the control signal to the second level in response to the second pulse.

BRIEF DESCRIPTION OF THE DRAWINGS

Preferred embodiments of the present invention will now be described with reference to the accompanying drawings in which.

DESCRIPTION OF THE PREFERRED EMBODIMENT

Figure 1:
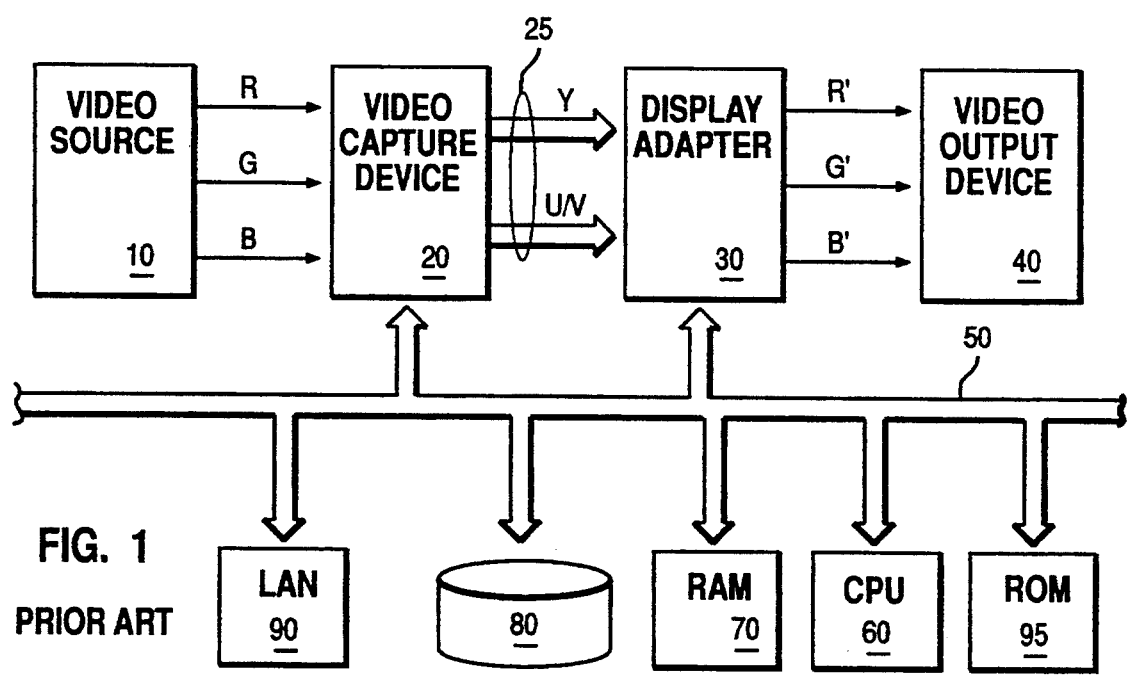
FIG. 1 is a block diagram of a digital video capture system.

Referring first to FIG. 1, an example of a digital video capture system comprises an analog video source 10 such as a color video camera, television receiver, video tape player or the like. The video source 10 generates red (R), green (G) and blue (B) video signals. The R, G and B video signals are sampled, digitized and processed by the video capture device 20 to produce digitized luminance and chrominance signals Y and U/V. The digitized Y and U/V signals are received by a receiving system in the form of a display adapter 30 connected to the bus architecture 50 of a host computer system such as a personal computer. The host computer system comprises a central processing unit (CPU) 60, random access memory (RAM) 70, read only memory 95 (ROM), and large capacity storage 80 such as a hard disk drive, tape streamer or the like, all interconnected by the bus architecture 50. The bus architecture 50 may also be connected to other computer systems in a local area network 90. The display adapter has red, green and blue analog video outputs (R', G' and B') connected to an analog video output device 40 such as a color display device, video tape recorder or the like. It will be appreciated that both the display adapter 30 and the video capture device 20 may be integrated on a single peripheral card adapted to be releasably connected to the bus architecture 50 of the computer system.

In operation, the central processing unit 60, under the control of an application computer program, can treat the digitized video image from the video capture device 20 as a data file that can be stored in the random access memory 70 or the storage device 80; communicated to other computer systems on the local area network 90; or adapted by the display adapter 30 for output to the video output device The digitized Y and U/V signals are sequences of 1-byte samples. Each sequence is transferred to the display adapter via a data communication channel 25 comprising a first in first out memory (FIFO) and a FIFO controller.

Figure 2:
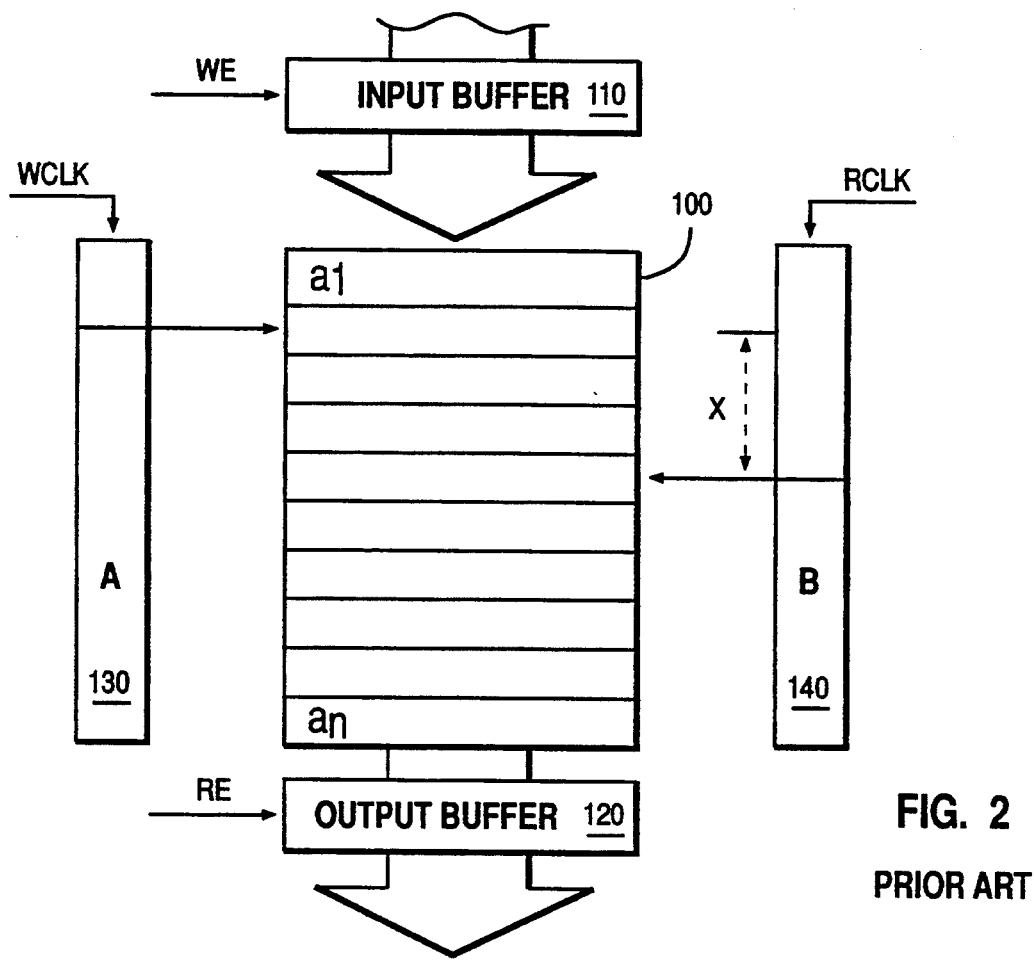
FIG. 2 is a block diagram of a typical FIFO.

Referring now to FIG. 2, an example of a FIFO, such as the uPD42101 produced by Nippon Electric Company, comprises a memory array in the form of a stack 100 of m addressable bytes of data. Data bytes are written into the stack in parallel via a 1-byte input buffer 110. Similarly, data bytes are read from the stack 100 in parallel via a 1-byte output buffer 120. A write address counter 130 or "pointer" indicates the memory address into which a byte stored in the input buffer 110 is to be written. Similarly, a read address pointer 140 indicates the memory address from which a byte is to be read into the output buffer 120.

The addresses indicated by the read and write address pointers are incremented by read and write clock signals RCLK and WCLK respectively. The read and write addresses are thus respectively indicative of the number of bytes written to and the number of bytes read from the stack 100. A data byte is loaded from the input buffer 110 into the address in the stack 100 specified by the write address pointer 130 in response to a write enable signal WE. Similarly, a data byte is read into the output buffer 120 from an address in the stack 100 specified by the read address pointer 140 in response to a read enable signal RE.

Figure 3:
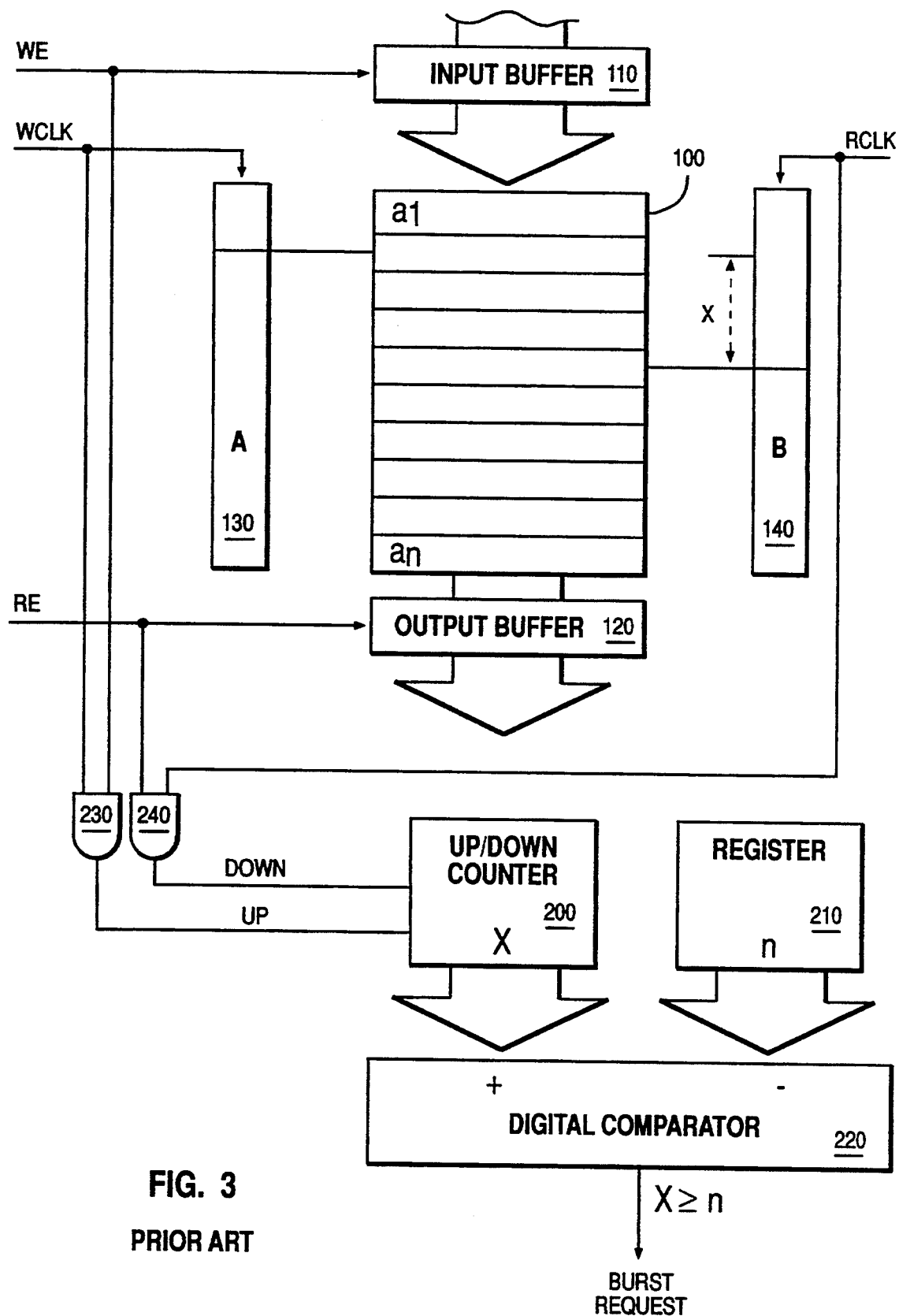
FIG. 3 is a block diagram of a conventional FIFO controller.

Referring now to FIG. 3, a conventional FIFO controller typically comprises an up/down counter 200 having a parallel output x and a register 210 having a parallel output n. The parallel outputs x and n are both respectively connected to signal and threshold inputs of a digital comparator 220. WCLK and WE are connected to inputs of an AND gate 230. The output of AND gate 230 is connected a count up clock input of the counter 200. Similarly, RCLK and RE are connected to inputs of an AND gate 240. The output of AND gate 240 is connected a count down clock input of the counter 200. A predetermined burst value is loaded into register 210 to set the threshold of the digital comparator 220. The burst value n specifies the number of data bytes to be read from the FIFO by the receiving system in response to each request data transfer signal.

In operation, when WE is set, WCLK is gated by AND gate 230 onto the count up clock input of the counter 200. The counter thus counts up as data bytes are written into successive addresses in the stack 100. Similarly, when RE is set, RCLK is gated by AND gate 240 onto the count down clock input of the counter 200. The counter 200 thus counts down as data bytes are read from successive addresses in the stack 100. Output x therefore indicates the difference between the number of bytes written to and the number of bytes read from the stack 100. When output x becomes greater than or equal to output n (the burst value), the comparator 120 sends a request data transfer signal to the receiving system.

Figure 4:
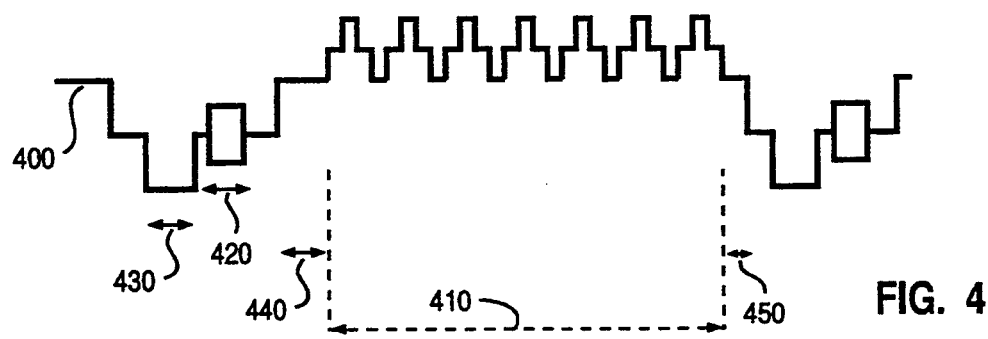
FIG. 4 is a waveform diagram of a typical video signal.

With reference to FIG. 4, a typical composite color video signal 400 comprises an active line portion 410, and a control portion including a color burst 420, a line sync pulse 430, and border portions 440 and 450.

Figure 5:
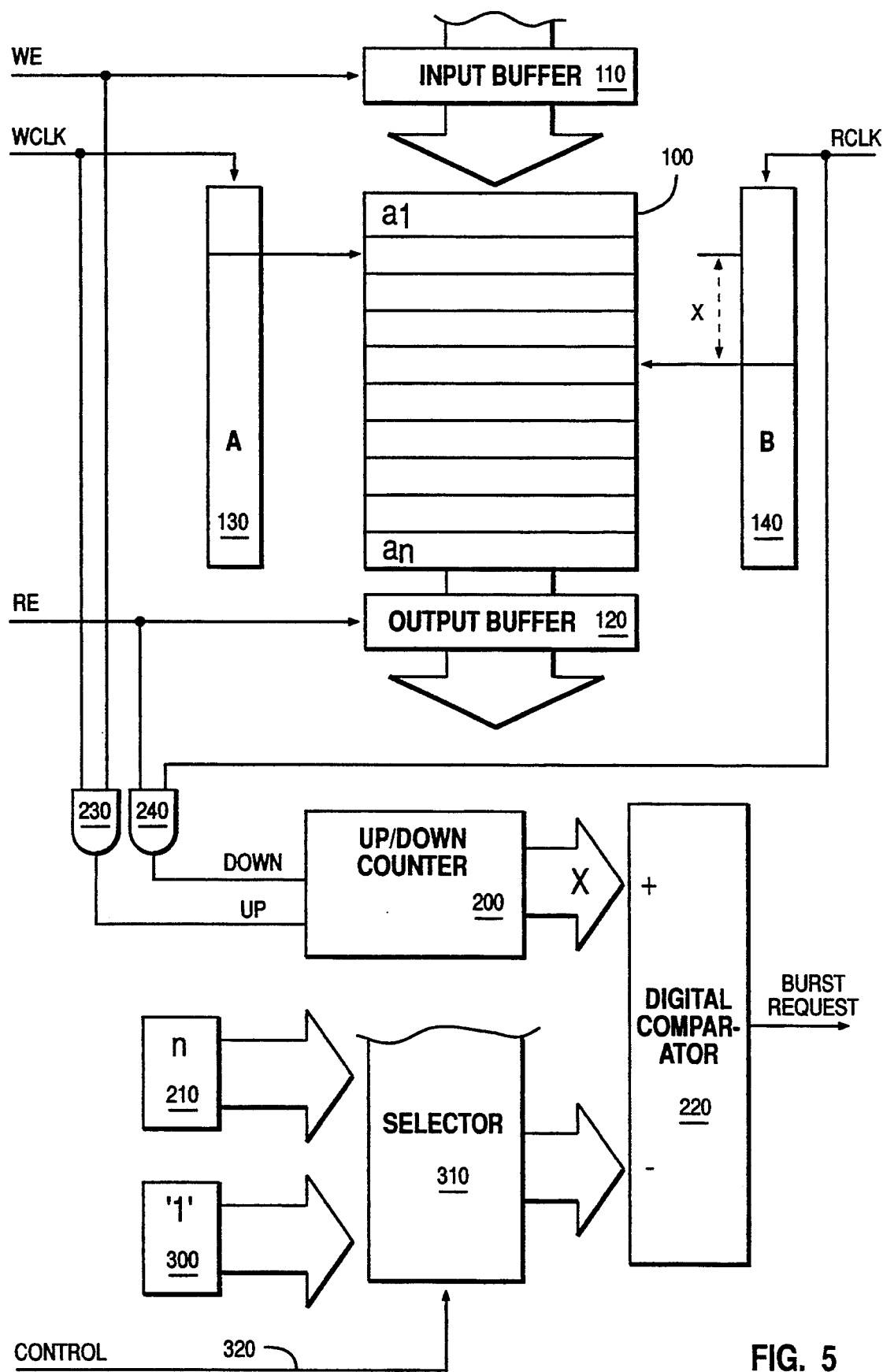
FIG. 5 is a block diagram of a FIFO controller of the present invention.

Referring now to FIG. 5, a preferred example of a FIFO controller of the present invention further comprises a selector 310 and another register 300. A value of "1" is loaded into register 300. The selector 310 is a combinatorial logic circuit responsive to a binary control signal 320 for connecting one of either the burst value n stored in register 210 or "1" stored in register 300 to the threshold input of the comparator 220. In operation, the register 300 is connected to the comparator 220 when the control signal is low and register 210 is connected to the comparator 220 when the control signal is high.

Figure 6:
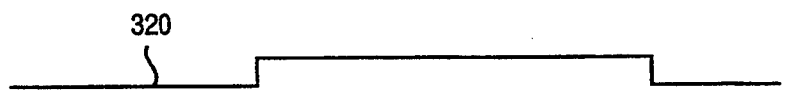
FIG. 6 is a control signal for the FIFO controller of the present invention.

With reference to FIG. 6, the binary control signal 320 is high during the active line portion 410 of the video signal 400 and low during the control portion. Thus, referring back to FIG. 5, during the active line portion 410 of the video signal 400, the threshold input is set to the predetermined burst value n. The comparator 220 therefore generates a request data transfer signal whenever the difference between the number of bytes written to and the number of bytes read from the FIFO 100 is greater than or equal to n. Thus, during the active line portion 410 of the video signal, data is read from the FIFO by the display adapter 30 only in continuous bursts each comprising n bytes. In a particularly preferred embodiment of the present invention, n is set to 8. However, it will be appreciated that n could be set to any value below the total number of addresses in the stack. During the control portion of the video signal 400, the threshold input of the comparator 220 is set to 1. The comparator 220 therefore generates a request data transfer signal whenever the difference between the number of bytes written to and the number of bytes read from the FIFO 100, as indicated by counter output x, is greater than or equal to 1. Thus, during the control portion of the video signal, the display adapter 30 reads data from the FIFO 100 if there is any difference at all between number of data bytes written to and the number data bytes read from the FIFO 100. Because the threshold is reduced to unity at the end of each active portion, if the number of bytes in each active line portion of the video signal is not divisible by the threshold value n, the residue retained in the FIFO 100 is read by the display adapter 30 before data corresponding to the next video line is written to the FIFO 100. Data corresponding to the edge of the video image is therefore not lost between transfers of successive video lines. Because the control portion of the video signal 400 is much shorter than the active line portion, most of a video picture captured and digitized by the video capture device 20 is transferred to the display adapter 30 in bursts thereby maximizing use of the bandwidth of the data communication channel. The captured picture can be reproduced in the display adapter without substantially reducing the rate of picture transmission from the video capture device. It will thus be appreciated that the present invention permits higher speed transmission of interrupted data flows than previously possible.

Figure 7:
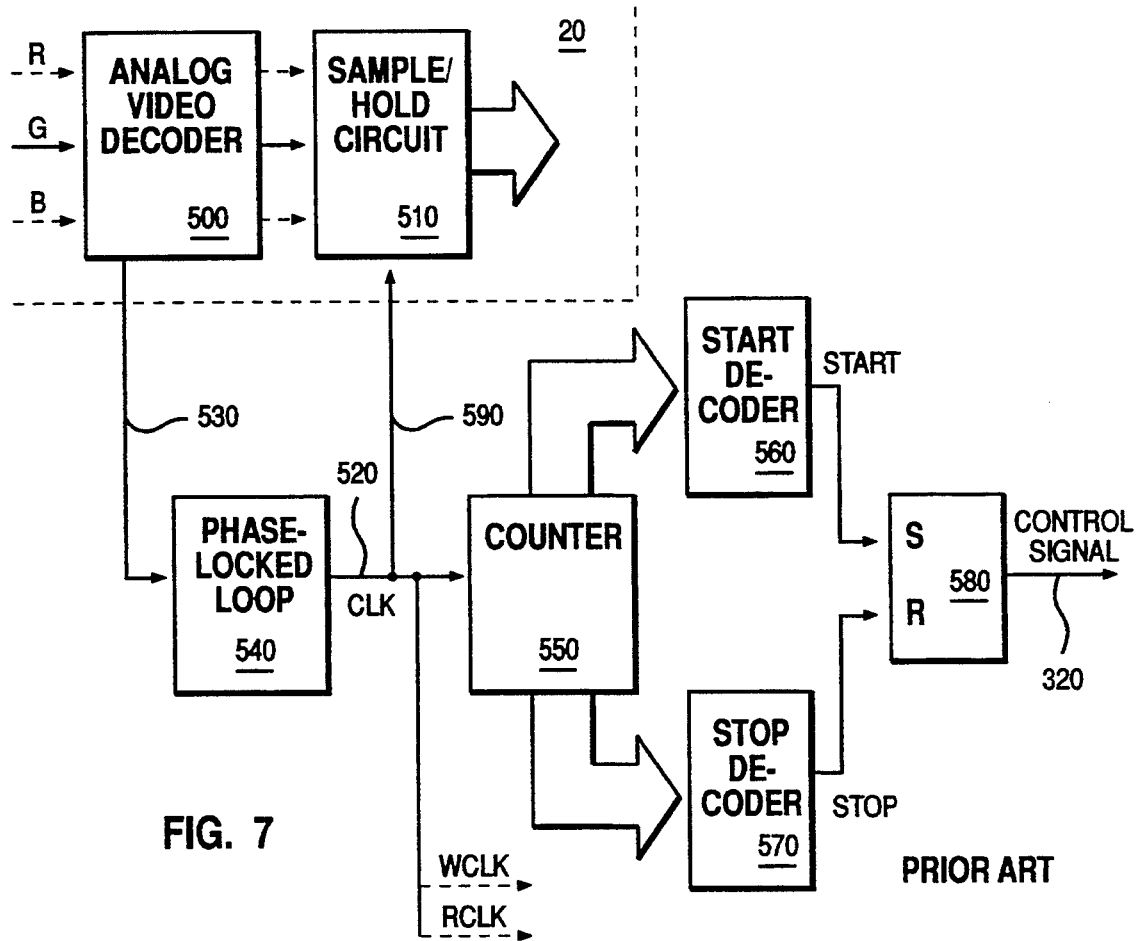
FIG. 7 is a block diagram of a logic circuit for generating the control signal.

Referring now to FIG. 7, an example of a circuit for generating the control signal in accordance with the present invention comprises a counter 550 and a set/reset (SR) latch 580. The count output from the counter 550 is connected to a start decoder 560 and a stop decoder 570. The outputs of the start and stop decoders are respectively connected to the set and reset inputs of the SR latch 580.

In operation, an analog video decoder 500 in the video capture device 20 extracts a line sync signal 530 from the input analog video signal. A phase-locked loop 540 synchronises a sample/hold signal 590 for triggering a sample/hold circuit 510 in the video capture device 20 to the line sync signal 530. The output from the phase-locked loop is also used to generate the read and write clock signals, RCLK and WCLK, and the read enable and write enable signals, RE and WE. In addition the output of the phase-locked loop is connected to the clock input of the counter 550. The start decoder is configured to generate an output pulse when the counter output reaches a first predetermined value. The output pulse from the start decoder sets the output of the SR latch 580 and the control signal 320 goes high. The stop decoder 570 is configured to generate an output pulse when the counter output reaches a second predetermined value that is greater than the first predetermined value. The output pulse from the stop decoder 570 resets the output of the SR latch 580 and the control signal 320 goes low. The first and second predetermined values are selected to provide a pulse in the control signal that is of the same length of the control portion of the input video signal.

Figure 8:
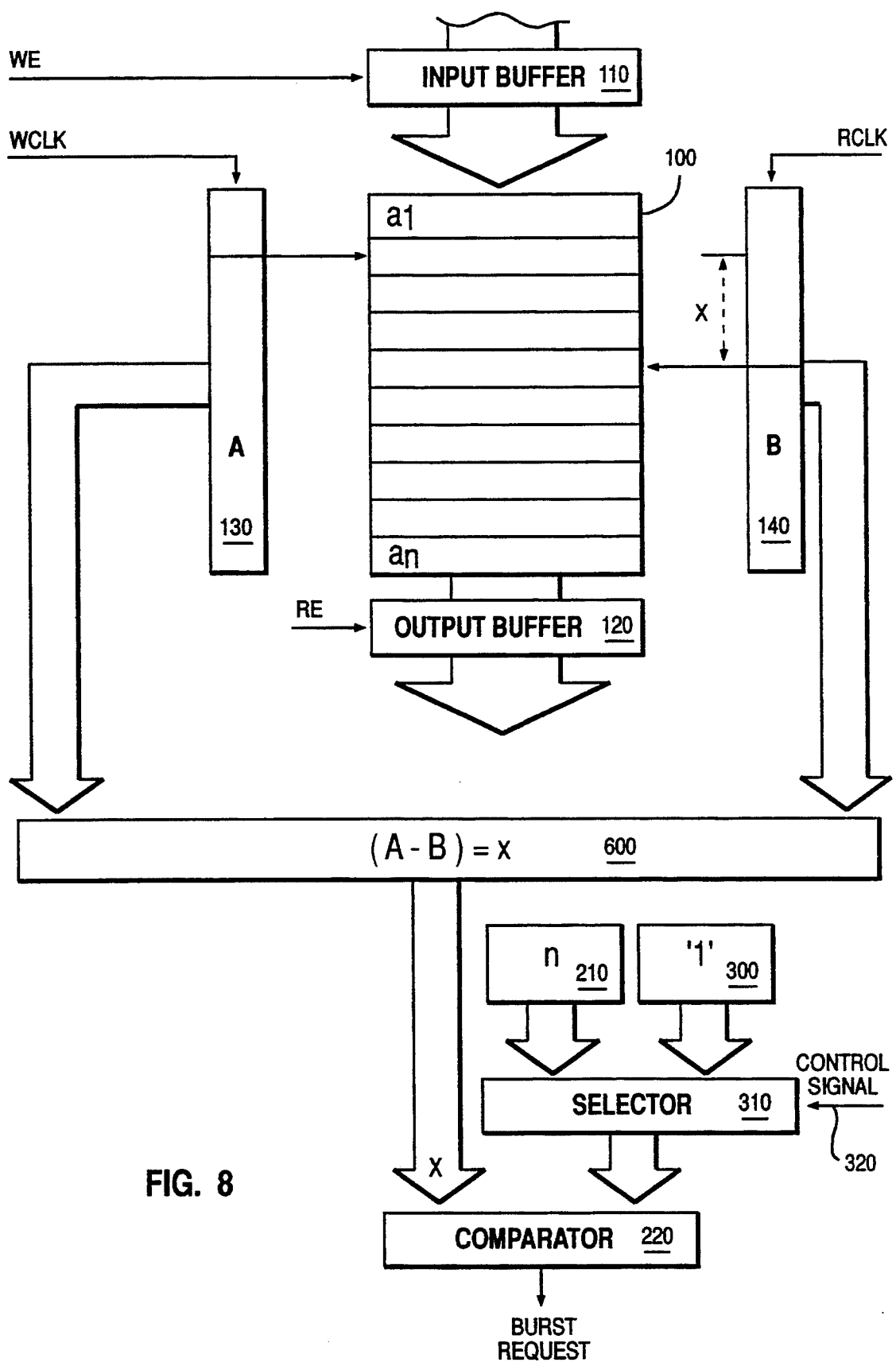
FIG. 8 is a block diagram of another FIFO controller of the present invention.

Referring now to FIG. 8, another example of the present invention, the inputs of a digital subtracter 600 are connected to parallel outputs of the read and write pointers, 130 and 140, of the FIFO 100. In operation, the digital subtracter subtracts the write address from the read address to generate the difference, x, between the number of bytes written to and the number of bytes read from the FIFO. In accordance with the present invention, the difference x is compared by the comparator 220 with either the threshold value n or 1 depending on the state of the control signal 320.

In the examples of the present invention hereinbefore described, the threshold input is switchable between the predetermined burst value n and 1. It will however be appreciated that, in other examples of the present invention, the threshold input could be switchable between two different burst values both greater than 1. Furthermore, in the examples of the present invention hereinbefore described, each address in the FIFO can hold one byte of data. It will however be appreciated that the present invention is equally applicable to FIFOs in which each address can hold more or less than 8 bits of data.

Although examples of the present invention have been described in the foregoing with reference to a color video capture system, it will now be appreciated that the present invention is equally applicable to monochrome video capture systems.

What is claimed is:

1. A FIFO memory controller for a digital video communications channel, the controller comprising:
   detector logic for detecting any difference between the number of addresses in the FIFO memory into which data is written and the number of addresses in the FIFO memory from which data is read;
   comparator logic for generating a request data transfer signal in response to said difference becoming greater than or equal to a threshold; and
   threshold select logic responsive to video data having at least an active line portion and a control portion being written to the FIFO memory, the threshold select logic setting the threshold to a first value when the active line portion is being written and setting the threshold to a second value, greater than the first value, when the control portion is being written.

2. A controller as claimed in claim 1, wherein the threshold select logic comprises:
   a control signal generator for generating a binary control signal in response to the video data being written to the FIFO memory, the control signal generator setting the control signal to a first level when the active line portion is being written and setting the control signal to a second level when the control portion is being written; and a demultiplexer for connecting a first register storing the first value to the comparator logic when the control signal is set to the first level and connecting a second register storing the second value to the comparator logic when the control signal is set to the second level.

3. A controller as claimed in claim 2, wherein the control signal generator comprises:
 a counter having a parallel output for counting addresses in the FIFO memory into which video data is being written;
 a first decoder connected to the parallel output for generating a first pulse in response to a first output count;
 a second decoder connected to the parallel output for generating a second pulse in response to a second output count, the second output count being greater than the first; and
 a bistable latch connected to the first and second decoders for setting the control signal to the first level in response to the first pulse and setting the control signal to the second level in response to the second pulse.

4. A controller as claimed in claim 1, wherein the detector logic comprises:
 an up/down counter having a parallel output;
 a count up clock input for incrementing the parallel output in response to video data being written in address in the FIFO memory; and
 a count down clock for decrementing the parallel output in response to video data being read from an address in the FIFO memory.

5. A controller as claimed in claim 1, wherein the detector logic comprises subtractor logic for subtracting a write address stored in a write address pointer connected to the FIFO memory from a read address stored in a read address pointer connected to the FIFO memory.

6. A controller as claimed in claim 1, wherein the first value is set to unity.

* * * * *